United States Patent
Mitani et al.

(10) Patent No.: US 7,507,389 B2
(45) Date of Patent: Mar. 24, 2009

(54) HYDROPHOBIC FUMED SILICA

(75) Inventors: Yoshio Mitani, Yamaguchi (JP);
Katsumi Nagase, Yamaguchi (JP);
Atsushi Takamuku, Yamaguchi (JP)

(73) Assignee: Tokuyama Corporation, Shunan-shi (JP)

( * ) Notice: Subject to any disclaimer, the term of this patent is extended or adjusted under 35 U.S.C. 154(b) by 194 days.

(21) Appl. No.: 10/555,440

(22) PCT Filed: Apr. 30, 2004

(86) PCT No.: PCT/JP2004/006308

§ 371 (c)(1),
(2), (4) Date: Nov. 3, 2005

(87) PCT Pub. No.: WO2004/099075

PCT Pub. Date: Nov. 18, 2004

(65) Prior Publication Data

US 2006/0269465 A1 Nov. 30, 2006

(30) Foreign Application Priority Data

May 6, 2003 (JP) ............................. 2003-127846

(51) Int. Cl.
*C01B 33/12* (2006.01)
(52) U.S. Cl. .................. 423/335; 423/336; 423/337
(58) Field of Classification Search .......... 423/335–340
See application file for complete search history.

(56) References Cited

U.S. PATENT DOCUMENTS

| 4,780,108 A | | 10/1988 | Razzano |
| 4,877,595 A | | 10/1989 | Klingle et al. |
| 5,063,179 A | * | 11/1991 | Menashi et al. ............... 501/12 |
| 5,776,240 A | * | 7/1998 | Deller et al. ................. 106/482 |
| 6,677,095 B2 | * | 1/2004 | Murota et al. ............ 430/108.3 |
| 2003/0103890 A1 | * | 6/2003 | Konya et al. ................ 423/335 |

FOREIGN PATENT DOCUMENTS

| EP | 0928818 B1 | 7/1999 |
| JP | 63-225518 A | 9/1988 |
| JP | 6-87609 A | 3/1994 |
| JP | 2000-256008 A | 9/2000 |

* cited by examiner

*Primary Examiner*—Ngoc-Yen M Nguyen
*Assistant Examiner*—Diana J Liao
(74) *Attorney, Agent, or Firm*—Birch, Stewart, Kolasch & Birch, LLP

(57) ABSTRACT

A hydrophobic fumed silica treated with a cyclic dimethylsiloxane, the hydrophobic fumed silica having an M-value representing an oleophilic degree in a range of 48 to 65, a tapping bulk density of not smaller than 80 g/L but not larger than 130 g/L, and an n-value representing the dispersion of 3.0 to 3.5 as measured in toluene. The hydrophobic fumed silica features a high bulk density while exhibiting a high hydrophobic property, the powder thereof capable of being favorably handled, being easily mixed in a matrix such as of a resin within short periods of time, and, further, being dispersed in the matrix to a high degree.

2 Claims, No Drawings

HYDROPHOBIC FUMED SILICA

TECHNICAL FIELD

The present invention relates to a novel hydrophobic fumed silica and to a method of producing the same. More specifically, the invention provides a hydrophobic fumed silica which features a high bulk density while exhibiting a high hydrophobic property, the powder thereof capable of being favorably handled, being easily mixed in a matrix such as of a resin within short periods of time, and, further, being dispersed in the matrix to a high degree.

BACKGROUND ART

A fumed silica obtained by hydrolyzing a silane halogenide such as silicon tetrachloride in an oxygen-hydrogen flame (a so-called dry method) has been widely used as a filler for resins such as silicone resins and painting materials.

However, the above fumed silica has a low bulk density (tapping bulk density of about 25 g/L as will be described later) and is poorly handled when it is used as a filler. In order to heighten the affinity to the matrix such as of resin, further, it has been attempted to treat the surfaces of the fumed silica with a hydrophobic property-imparting agent such as a cyclic dimethylsiloxane to impart a high degree of hydrophobic property thereto. However, the hydrophobic fumed silica obtained through the above-mentioned hydrophobic property-imparting treatment tends to be handled less favorably, tends to become powdery to an excess degree when being handled, and is poorly kneaded together with the matrix.

Further, the treatment for increasing the bulk density has heretofore been carried out by using a ball mill. For example, the hydrophobic fumed silica is treated by using the ball mill to increase its bulk density (see Prior Arts A and B).

Prior Art A: Japanese Unexamined Patent Publication (Kokai) No. 87609/1994

Prior Art B: Japanese Unexamined Patent Publication (Kokai) No. 256008/2000).

The hydrophobic fumed silica treated by the ball mill exhibits a tapping bulk density which is increased to its upper limit of about 180 g/L but involves a problem of low dispersion in the resins.

DISCLOSURE OF THE INVENTION

It is therefore an object of the present invention to provide a hydrophobic silica which can be very favorably dispersed in a matrix such as a resin yet maintaining a high bulk density and a stable hydrophobic property, and a method of producing the same.

The present inventors have conducted keen study in order to achieve the above object. As a result, the inventors have succeeded in obtaining a hydrophobic fumed silica that satisfies the above object by increasing the bulk density of the fumed silica by the compacting method prior to imparting hydrophobic property thereto and, then, by bringing the fumed silica into contact with a cyclic dimethylsiloxane, and have finished the invention.

Namely, the present invention provides a hydrophobic fumed silica treated with a cyclic dimethylsiloxane, the hydrophobic fumed silica having an M-value representing an oleophilic degree in a range of 48 to 65, a tapping bulk density of larger than 80 g/L but not larger than 130 g/L, and an n-value representing the dispersion of 3.0 to 3.5 as measured in toluene.

In the hydrophobic fumed silica of the present invention, it is desired that:

(a) the nitrogen content is not larger than 15 ppm, and the total amount of metals and metal oxide impurities is not larger than 10 ppm calculated as metals; and (b) the content of aggregated particles of not smaller than 45 μm is not larger than 200 ppm.

The invention further provides a method of producing a hydrophobic fumed silica by compacting a fumed silica to increase its bulk density, and by bringing the fumed silica into contact with a gaseous cyclic dimethylsiloxane.

In the above production method, it is desired that:

(c) the compacting treatment is so conducted that the tapping bulk density of the fumed silica becomes 70 to 120 g/L;

(d) the compacting treatment is conducted by using a vacuum compressor; and (e) the cyclic dimethylsiloxane that is used has a boiling point of not higher than 300° C.

In this specification, properties such as the above M-value, tapping bulk density and n-value are those values measured according to the measuring methods described in Examples of this specification.

That is, the invention employs a compacting treatment as means for enhancing the bulk density. The compacting treatment makes it possible to improve the dispersion in the matrix such as a resin or a silicone oil and, hence, to obtain a hydrophobic fumed silica having an n-value in a range which is as high as 3.0 to 3.5 as measured in toluene. When the treatment is conducted by using, for example, a ball mill, the n-value in toluene is low (2.7 or lower) and the dispersion in the resin decreases as demonstrated in Comparative Examples 4 and 5 appearing later. Presumably, a high shearing force is exerted during the ball mill-treatment, and aggregated particles having a strong bonding force are formed a lot to deteriorate the dispersion. In the compacting treatment used in the present invention, on the other hand, the shearing force is not almost produced during the treatment, and the aggregated particles are formed very little. As a result, it is believed that a high n-value is exhibited in toluene and dispersion in the matrix is improved as demonstrated in Examples 1 to 5 appearing later.

The n-value in toluene represents a dispersion in the matrix such as resin or silicone oil, and it can be said that the dispersion in the matrix is improved with an increase in the n-value.

In the present invention, further, it is very important to compact the fumed silica prior to putting it to the hydrophobic property-imparting treatment with the cyclic dimethylsiloxane. To increase the bulk density of the hydrophobic fumed silica, it is a generally accepted practice to put a fumed silica to the hydrophobic property-imparting treatment followed by the treatment by using the ball mill. The treatment with the ball mill is never effected prior to the hydrophobic property-imparting treatment. This is because, if the fumed silica is treated with the ball mill before it is put to the hydrophobic property-imparting treatment or while it is being put to the hydrophobic property-imparting treatment, then, the particles bond together or strongly aggregate together and, hence, the silica is poorly dispersed in the resin in a subsequent step. When the compacting treatment is effected after the fumed silica has been put to the hydrophobic property-imparting treatment according to a conventional procedure, limitation is imposed on increasing the bulk density, and the tapping bulk density is increased only to about 59 g/L as described in, for example, Comparative Example 2. Though the reason has not been clarified yet, it is presumed that the effect of molecules of the hydrophobic property-imparting agent (cyclic dimethylsiloxane) chemically bonded to, or physically adsorbed by, the surfaces of the silica particles appears in the compressing treatment after the hydrophobic property-imparting treatment. Namely, this is presumably due to that the hydrophilic surfaces of the fumed silica are covered with OH groups and the particles are suitably aggregated due to hydrogen bond or the like bond. Therefore, while the bulk density can be increased, once the hydrophobic property has been imparted, suitable aggregation among the particles is impaired being affected by the molecules of the modified hydrophobic property-imparting agent, and the air present among the silica particles is not removed to a sufficient degree making it difficult to increase the bulk density of the fumed silica. According to the present invention, on the other hand, the compacting treatment is effected prior to the hydrophobic property-imparting treatment (i.e., effected in the stage of the hydrophilic surface where there is no hydrophobic property-imparting agent that impairs the de-aeration). Therefore, the tapping bulk density of the hydrophobic fumed silica obtained by imparting the hydrophobic property thereto can be increased up to a region higher than 80 g/L.

According to the present invention as described above, it is allowed to obtain a hydrophobic fumed silica which can be excellently handled yet exhibiting a high degree of dispersion in a variety of matrixes and having a high bulk density.

BEST MODE FOR CARRYING OUT THE INVENTION

Preparation of the Hydrophobic Fumed Silica

The hydrophobic fumed silica of the invention is obtained by putting a fumed silica to the hydrophobic property-imparting treatment with a cyclic dimethylsiloxane after the bulk density of the fumed silica has been increased through the compacting treatment.

The fumed silica used as the starting material is obtained through the above-mentioned dry method and, usually, has a BET specific surface area of 40 to 450 $m^2/g$ and, particularly, 80 to 320 $m^2/g$.

The compacting treatment carried out prior to the hydrophobic property-imparting treatment is means for increasing the bulk density without almost giving mechanical shearing force, and is clearly distinguished from the treatment using the ball mill that gives a high mechanical shearing force. Its concrete examples include a reduced-pressure (vacuum) compacting method and a pressurized compacting method.

The reduced-pressure (vacuum) compacting method can be put into practice by using a known vacuum compressor. A representative vacuum compressor includes a rotary drum which has a filter-like surface and is capable of evacuating from the interior thereof, and a squeezing member disposed facing the drum. The squeezing member has a squeezing surface of which the gap relative to the drum surface is narrowed in a direction in which the drum rotates. That is, the drum is rotated while continuing the evacuation, and a layer of a powder having a high bulk density is formed on the surface of the drum by pressing the squeezing surface of the squeezing member onto the surface of the drum by the de-aeration while having the fumed silica adhered on the drum surface (filter-like surface) by suction. The layer of powder formed on the drum surface is scrapped off the surface of the drum by using a scraper or the like to obtain a fumed silica which is compacted and has a high bulk density. The squeezing member may be a rotary member having the same structure as the drum. The vacuum compressor having such a structure may be, for example, a continuous type powder de-aerating device placed in the market by Bubcock BSH in the trade name of Vacu-Press.

The compacting treatment based on the pressurized compacting method is carried out by using a flexible container having gas permeability to a degree which, for example, does not permit the passage of the fumed silica, filling the flexible container with the fumed silica, and compressing the flexible container by a pressing machine.

By increasing the bulk density by the compacting treatment producing a very small mechanical shearing force as described above, it is made possible to suppress the formation of aggregated particles as much as possible and to improve the dispersion.

The compacting treatment is effected to a degree that the tapping bulk density becomes 70 to 120 g/L. Here, the tapping bulk density slightly increases due to the hydrophobic property-imparting treatment effected next. Therefore, its lower limit of 70 g/L is sufficient. When the tapping bulk density is too high, the kneading with the matrix is lowered. Therefore, the upper limit of tapping bulk density is 120 g/L.

In the present invention, the bulk density is increased through the compacting treatment and, then, the hydrophobic property-imparting treatment is conducted by using the cyclic dimethylsiloxane to thereby obtain a desired hydrophobic silica.

The hydrophobic property-imparting treatment is carried out by bringing the gaseous cyclic dimethylsiloxane into contact with the fumed silica of which the bulk density has been enhanced through the compressing treatment. In order to impart a high n-value, it is desired that the contact is effected under a condition where a high shearing force is not exerted on the fumed silica, e.g., the fumed silica is brought into contact with the cyclic dimethylsiloxane gas while weakly stirring the fumed silica by using stirrer vanes or while fluidizing the fumed silica with the cyclic dimethylsiloxane gas or with an inert gas such as nitrogen. This is because, when the two are contacted together by using the ball mill or the like, a high shearing force is exerted, whereby aggregated particles are formed, it becomes difficult to impart a high n-value that will be described later, and the dispersion drops. In effecting the contact, further, a water vapor may be made present as required.

As the cyclic dimethylsiloxane used as the hydrophobic property-imparting agent, there can be used those that have been known without any limitation. In particular, it is desired to use a cyclic dimethylsiloxane of a low molecular weight that can be easily gasified having a boiling point of, for example, not higher than 300° C. In particular, to obtain a hydrophobic fumed silica realizing high hydrophobic property and good dispersion, there can be preferably used hexamethylcyclotrisiloxane, octamethylcyclotetrasiloxane or decamethylcyclopentasiloxane. Among them, it is most desired to use the octamethylcyclotetrasiloxane that can be easily refined by distillation. The cyclic dimethylsiloxanes may be those in which some of the methyl groups bonded to the silicon atoms have a substituent. The substituent should not be a group having a nitrogen atom such as an amino group. It is desired that the cyclic dimethylsiloxane has a high purity from the standpoint of preventing coloring when the hydrophobic fumed silica is added to the matrix such as a resin.

In conducting the hydrophobic property-imparting treatment, it is allowable to use a reaction promoter. From the standpoint of preventing coloring, however, it is recommended to avoid the use of nitrogen compounds such as ammonia or amines as the reaction promoter.

The cyclic dimethylsiloxane may be used in such an amount (surface treating amount) that the M-value representing the oleophilic property is in a range of 48 to 65 and, usually, in an amount in a range of 10 to 100 parts by weight per 100 parts by weight of the fumed silica though it varies depending upon the kind of the cyclic dimethylsiloxane that is used.

After the hydrophobic property-imparting treatment, it is desired to purge the unreacted cyclic dimethylsiloxane remaining in the treatment vessel with an inert gas such as nitrogen to a sufficient degree and to take out the hydrophobic fumed silica.

(Hydrophobic Fumed Silica)

The hydrophobic fumed silica of the present invention obtained as described above has been treated with the cyclic dimethylsiloxane so as to possess an M-value representing the oleophilic degree of not smaller than 48 and, preferably, 50 to 65. The higher the M-value is, the higher the oleophilic degree is or, in other words, the higher the hydrophobic property is. The hydrophobic fumed silica of the present invention having such a high degree of hydrophobic property exhibits a degree of affinity to the matrix such as the resin, and exhibits the function as a reinforcing agent to a sufficient degree.

The hydrophobic fumed silica of the present invention has been heightened for its bulk density through the compacting treatment of before the hydrophobic property-imparting treatment and has further been heightened for its bulk density to some extent through the hydrophobic property-imparting treatment after the compacting treatment. Therefore, the hydrophobic fumed silica of the invention has a tapping bulk density in a range in excess of 80 g/L but not larger than 130 g/L. That is, with the tapping bulk density lying within the above range, the hydrophobic fumed silica of the invention exhibits excellent handling property, very effectively prevents the formation of powder when it is being handled, and is very quickly kneaded with the matrix and, particularly, with the resin such as silicone resin. For example, when the tapping bulk density is lower than the above range, the hydrophobic fumed silica forms much powder when it is being handled. When the tapping bulk density is higher than the above range, on the other hand, the hydrophobic fumed silica is less kneaded with the matrix.

With the hydrophobic fumed silica of the invention, further, the bulk density does not decrease even after it is pneumatically transported, and the bulk density of immediately after the production is effectively maintained. For instance, the bulk return ratio (R: %) after transported by a diaphragm pump of a blow-out amount of 100 kg/hour is not larger than 15%.

Here, the bulk return ratio (R: %) is found from a tapping bulk density ($d_1$) of the hydrophobic fumed silica immediately after the production and from a tapping bulk density ($d_2$) after penumatically transported by a diaphragm pump of a blow-out amount of 100 kg/hour in accordance with the following formula, $$R(\%)=((d_1-d_2)/d_1)\times 100$$

The hydrophobic silica of the present invention has its bulk density enhanced through the pressing treatment prior to being put to the hydrophobic property-imparting treatment and, hence, exhibits a high bulk density and a high degree of hydrophobic property and, further, possesses an n-value which is as high as 3.0 to 3.5 and, particularly, 3.2 to 3.5 in toluene, exhibiting a high degree of dispersion in the matrix such as a resin. The hydrophobic fumed silica having a high bulk density and a high degree of hydrophobic property can be obtained even by a conventional method that enhances the bulk density by the treatment using the ball mill after the hydrophobic property-imparting treatment. In this case, however, the obtained hydrophobic fumed silica exhibits an n-value which is very low in toluene and low dispersion in the matrix. Through the above-mentioned production method, there is obtained the hydrophobic fumed silica having a high n-value and, hence, an excellent dispersion in the matrix such as the resin, in addition to the high bulk density and the hydrophobic property. Namely, the hydrophobic fumed silica of the present invention is a novel one that had not at all been known so far.

The hydrophobic fumed silica of the invention described above is put to the compressing treatment and to the hydrophobic property-imparting treatment without receiving a high mechanical shearing force. Even prior to being mixed into the matrix such as the resin, therefore, the hydrophobic fumed silica does not almost contain coarse aggregated particles, i.e., contains the aggregated particles having particle diameters of not smaller than 45 μm in an amount of not larger than 200 ppm and, particularly, not larger than 50 ppm, and can be easily kneaded in the matrix within short periods of time. As will be described in Comparative Examples appearing later, on the other hand, the hydrophobic fumed silica obtained through the ball mill treatment contains the aggregated particles having particle diameters of not smaller than 45 μm in an amount of more than 200 ppm and then-value is small. When the above hydrophobic fumed silica is mixed with the matrix such as a resin, therefore, a very long period of time is necessary for obtaining a sufficient degree of transparency and, besides, a mixing device of a large output is necessary, which is disadvantageous from the standpoint of work.

Besides, the hydrophobic fumed silica obtained through the ball mill treatment receives a high shearing force during the treatment; i.e., the material of the treating apparatus is worn out and impurities may infiltrate into the fumed silica. However, the hydrophobic fumed silica according to the present invention is obtained without through a treatment in which a high shearing force is produced. Therefore, the total amount of metals and metal oxide impurities can be suppressed to be not larger than 10 ppm and, preferably, not larger than 5 ppm calculated as metal elements. When mixed into the resin, therefore, the hydrophobic fumed silica of the invention does not induce color that stems from the infiltration of impurities, and can be favorably used for the insulating materials into which the metal compounds must not be added.

In order to effectively prevent the coloring when the hydrophobic fumed silica of the invention is dispersed in the matrix, further, it is desired that the cyclic dimethylsiloxane which is a hydrophobic property-imparting agent has a high purity, so that the content of nitrogen that infiltrates is not larger than 15 ppm and, preferably, not larger than 5 ppm.

When used as a filler for the resin such as the silicone resin, the hydrophobic fumed silica of the present invention can be highly filled in the resin owing to its excellent kneading property stemming from a high density and a high oleophilic degree. Owing it its high n-value, further, the hydrophobic fumed silica can be highly dispersed in the resin. As a result, the obtained resin composition is colorless, highly transparent, and exhibits a high reinforcing property.

The hydrophobic fumed silica of the invention can be used as a filler for the silicone resin, and as a viscosity-adjusting agent or as a drip-preventing agent for the unsaturated polyester resin, vinyl ester resin, urethane resin and epoxy resin, and from which a variety of effects can be expected owing to the above features. Further, owing to its excellent fluidity, the hydrophobic fumed silica of the invention can also be used as a powdery coating material, as a fire extinguisher, and as an additive for imparting fluidity to powdery materials in general.

EXAMPLES

The invention will be described more concretely by way of Examples to which only, however, the invention is in no way limited.

In the following Examples, the basic properties, i.e., M-value, tapping bulk density, n-value in toluene, specific surface area, nitrogen content, content of aggregated particles, transparency which is an applied property, n-value in silicone oil and kneading property were measured by the methods described below.

(1) M-Value.

The hydrophobic fumed silica floats on water but is completely suspended in methanol. By utilizing this, a modified hydrophobic degree measured by the following method is regarded as an M-value and is used as an index of hydrophobic property-imparting treatment with a hydrophobic group on the silica surfaces.

0.2 Grams of the hydrophobic fumed silica is added to 50 mL of water in a beaker of a volume of 250 mL. Methanol is dripped from a burette until the whole amount of silica is suspended. The solution in the beaker is maintained stirred at all times with a magnetic stirrer. A moment when the hydrophobic silica is all suspended in the solution is regarded to be an end point, and the volume percentage of methanol in the liquid mixture in the beaker at the end point is regarded to be the M-value.

(2) Tapping Bulk Density.

The fumed silica is permitted to freely fall into a 1000-mL messcylinder up to a graduate of 800 mL. The opening of the messcylinder is wrapped with a film. The messcylinder is tapped 30 times from a height of 10 cm at a rate of one time per one second. The messcylinder is then permitted to stand still for 20 minutes and the upper surface of the powder layer at this moment is read from the graduate. The tapping bulk density is found from this value (volume) and the weight of the fumed silica in the messcylinder measured by using a measuring instrument. The tapping bulk density thus measured becomes higher than an ordinary bulk density (free fall bulk density) due to the tapping.

(3) n-Value in Toluene.

The n-value in toluene is measured in compliance with the description of the Journal of the Ceramic Society of Japan 101[6] 707-712 (1993). That is, 20 mL of toluene is introduced into a beaker, 0.3 g of the hydrophobic fumed silica is added thereto and is dispersed with ultrasonic waves (150 W, 90 sec) and, then, the absorbencies are measured at 700 nm and 460 nm. The absorbencies are substituted for the following formula, and the obtained value is used as the n-value which is an index of dispersion. The larger the value, the better the dispersion.

$n\text{-Value}=2.382\times Ln[(\text{absorbency at 460 nm})/(\text{absorbency at 700 nm})]$ (4) Specific Surface Area.

Measured relying upon the nitrogen adsorption BET 1-point method by using a specific surface area-measuring apparatus (SA-1000) manufactured by Shibata Rikagaku Co.

(5) Content of Aggregated Particles.

5 Grams of the hydrophobic fumed silica is weighed, wet with 50 mL of methanol, followed by the addition of 50 mL of pure water to prepare a suspension containing the hydrophobic fumed silica. Then, the whole amount of the suspension is poured onto a sieve having a size of opening of 45 μm and an opening area of 12.6 cm$^2$ while flowing the water at a rate of 5 L/min. The water is further permitted to flow continuously for 5 minutes. The silica remaining on the sieve is dried and is, then, measured to find the content of the aggregated particles.

(6) Content of Nitrogen.

5 Milligrams of the hydrophobic fumed silica is weighed to find the content of nitrogen which it contains by using a trace-amount-of-nitrogen analyzer (model TN-10 manufactured by Mitsubishi Kagaku Co.).

(7) Content of Metals.

2 Grams of the hydrophobic fumed silica is weighed, transferred onto a platinum dish followed by the addition of 10 mL of methanol, and to which are further added 10 mL of concentrated nitric acid and 10 mL of hydrofluoric acid. The mixture is heated and evaporated, and the silica component is completely decomposed, dried and solidified. After once cooled, 2 mL of concentrated nitric acid is added thereto and is heated to dissolve. After cooled, the solution in the platinum dish is transferred into a 50-mL messflask, and pure water is poured up to an indicator to measure the content of metals by the ICP light-emitting spectral analysis (ICPS-1000IV manufactured by Shimazu Mfg Co.). The content of metals is the sum of contents of Fe, Al, Ni, Cr and Ti calculated as metal elements.

(8) Transparency.

3.4 Grams of the hydrophobic fumed silica is added to 170 g of a silicone oil having a viscosity at 25° C. of 3000 cSt, and is dispersed for one minute and for three minutes at normal temperature (using a homomixer manufactured by Tokushukika Kogyo Co.). After left to stand in a constant-temperature bath maintained at 25° C. for 2 hours, the hydrophobic fumed silica is evacuated and de-aerated to measure the absorbency at 700 nm. The transparency is evaluated depending upon the absorbency. The smaller the numerical value, the higher the transparency.

(9) n-Value in Silicone Oil.

The sample prepared by the method described in the section of Transparency (8) above is measured in the same manner as that for the n-value in toluene and is calculated. The larger the value, the better the dispersion. Between the 1-minute dispersion and the 3-minute dispersion, the one having a smaller difference indicates that the hydrophobic fumed silica is dispersed easily and within a short period of time.

(10) Kneading.

36 Grams of a silicone coil having a viscosity at 25° C. of 10,000 cSt is introduced, first, into a mixer portion of the Laboplusto-mill (model 20R200 manufactured by Toyo Seiki Seisakusho Co.) and, then, 18 g of the hydrophobic fumed silica is continuously introduced while stirring the blades, and the time (in seconds) is measured until the whole amount is kneaded with the oil. The shorter the time, the superior the kneading property.

(11) Coloring.

60 Grams of silica is added to 150 g of silicone gum having a viscosity at 25° C. of 1,000,000 cSt, and the mixture is kneaded by using a two-roll mill (roll diameter of 200 mm, manufactured by Inoue Mfg. Co.) for 15 minutes. Thereafter, a sheet having a thickness of about 7 mm is prepared, and the degree of coloring is judged by eyes. In Table 1, the judged results are such that ○ represents no color, Δ represents a slightly colored state, and X represents a colored state.

Example 1

The fumed silica (specific surface area of 207 m$^2$/g, tapping bulk density of 25 g/L) was compacted by using a vacuum compressor. The bulk density thereof after the treatment was 92 g/L.

10 kg of the fumed silica was stirred and mixed in a mixer having a volume of 300 L and the space in the mixer was substituted to a nitrogen atmosphere. The hydrophobic property-imparting treatment was conducted for one hour at a reaction temperature of 290° C. by supplying an octamethylcyclotetrasiloxane in a gaseous form at a rate of 150 g/min for 20 minutes. After the reaction, nitrogen was supplied for 25 minutes at a rate of 40 L/min to remove the unreacted products and byproducts of the reaction. The fumed silica put to the hydrophobic property-imparting treatment as described above possessed a specific surface area of 160 m$^2$/g, a tapping bulk density of 101 g/L, an M-value of 56, and an n-value in toluene of 3.4. Basic properties of the above hydrophobic fumed silica were as shown in Table 1.

The bulk return ratio (R: %) of the hydrophobic fumed silica was 9%.

The hydrophobic fumed silica obtained above was dispersed in a silicone oil; i.e., the hydrophobic fumed silica could be easily dispersed exhibiting colorless and clear appearance, and could be favorably kneaded. Table 2 shows the measured results of properties of the hydrophobic fumed silica applied to the silicone oil.

Example 2

10.0 kg of the fumed silica compacted in the same manner as in Example 1 was stirred and mixed in the mixer having a volume of 300 L and the space in the mixer was substituted to a nitrogen atmosphere. The hydrophobic property-imparting treatment was conducted for about 2 hours at a reaction temperature of 280° C. by supplying the octamethylcyclotetrasiloxane in a gaseous form for 15 minutes at a rate of 150 g/min.

After the reaction, nitrogen was supplied for 25 minutes at a rate of 40 L/min to remove the unreacted products and byproducts of the reaction. The fumed silica put to the hydrophobic property-imparting treatment as described above possessed a specific surface area of 167 m$^2$/g, a tapping bulk density of 99 g/L, an M-value of 51, and an n-value in toluene of 3.3. Basic properties of the above hydrophobic fumed silica were as shown in Table 1.

The bulk return ratio (R: %) of the hydrophobic fumed silica was 10%.

The hydrophobic fumed silica obtained above was dispersed in a silicone oil; i.e., the hydrophobic fumed silica could be easily dispersed exhibiting colorless and clear appearance, and could be favorably kneaded. Table 2 shows the measured results of properties of the hydrophobic fumed silica applied to the silicone oil.

Example 3

The fumed silica (specific surface area of 204 m$^2$/g, tapping bulk density of 26 g/L) was compacted by using a vacuum compressor. The bulk density thereof after the treatment was 114 g/L. The fumed silica was put to the hydrophobic property-imparting treatment in the same manner as in Example 1. The obtained hydrophobic fumed silica possessed a specific surface area of 159 m$^2$/g, a tapping bulk density of 126 g/L, an M-value of 55, and an n-value in toluene of 3.3. Basic properties of the above hydrophobic fumed silica were as shown in Table 1.

The bulk return ratio (R: %) of the hydrophobic fumed silica was 7%.

The hydrophobic fumed silica obtained above was dispersed in a silicone oil; i.e., the hydrophobic fumed silica could be easily dispersed exhibiting colorless and clear appearance, and could be favorably kneaded. Table 2 shows the measured results of properties of the hydrophobic fumed silica applied to the silicone oil.

Example 4

The fumed silica compacted in the same manner as in Example 3 was put to the hydrophobic property-imparting treatment in the same manner as in Example 1 but using, as a hydrophobic property-imparting agent, a cyclic dimethylsiloxane mixture comprising 5 parts by weight of a hexamethylcyclotrisiloxane, 75 parts by weight of a octamethylcyclotetrasiloxane, and 20 parts by weight of a decamethylcyclopentasiloxane. The obtained hydrophobic fumed silica possessed a specific surface area of 162 m$^2$/g, a tapping bulk density of 124 g/L, an M-value of 55, and an n-value in toluene of 3.3. Basic properties of the above hydrophobic fumed silica were as shown in Table 1.

The bulk return ratio (R: %) of the hydrophobic fumed silica was 8%.

The hydrophobic fumed silica obtained above was dispersed in a silicone oil; i.e., the hydrophobic fumed silica could be easily dispersed exhibiting colorless and clear appearance, and could be favorably kneaded. Table 2 shows the measured results of properties of the hydrophobic fumed silica applied to the silicone oil.

Example 5

The fumed silica (specific surface area of 305 m$^2$/g, tapping bulk density of 25 g/L) was compacted by using a vacuum compressor to increase the tapping bulk density up to 76 g/L. Then, the fumed silica was put to the hydrophobic property-imparting treatment in the same manner as in Example 1 by using the decamethylcyclopentasiloxane as the hydrophobic property-imparting agent. The obtained hydrophobic fumed silica possessed a specific surface area of 225 m$^2$/g, a tapping bulk density of 87 g/L, an M-value of 56, and an n-value in toluene of 3.4. Basic properties of the above hydrophobic fumed silica were as shown in Table 1.

The bulk return ratio (R: %) of the hydrophobic fumed silica was 10%.

The hydrophobic fumed silica obtained above was dispersed in a silicone oil; i.e., the hydrophobic fumed silica could be easily dispersed exhibiting colorless and clear appearance, and could be favorably kneaded. Table 2 shows the measured results of properties of the hydrophobic fumed silica applied to the silicone oil.

Comparative Example 1

The fumed silica (specific surface area of 207 m$^2$/g, tapping bulk density of 25 g/L) was fed into a mixer having a volume of 300 L maintaining its own bulk without being compressed, and was put to the hydrophobic property-imparting treatment in the same manner as in Example 1. The feeding amount was 2 kg. The obtained hydrophobic fumed silica possessed a specific surface area of 160 m$^2$/g, a tapping bulk density of 31 g/L, an M-value of 58, and an n-value in toluene of 3.4. Basic properties of the above hydrophobic fumed silica were as shown in Table 1.

The bulk return ratio (R: %) of the hydrophobic fumed silica was 27%.

The hydrophobic fumed silica obtained above was dispersed in a silicone oil; i.e., the hydrophobic fumed silica exhibited colorless and clear appearance, but could be kneaded very poorly requiring a time of as long as 280 seconds in the kneading test. Table 2 shows the measured results of properties of the hydrophobic fumed silica applied to the silicone oil.

Comparative Example 2

The hydrophobic fumed silica having a tapping bulk density of 31 g/L prepared in Comparative Example 1 was compressed by using the vacuum compressor. However, the tapping bulk density after the compression could be increased up to only 59 g/L. The hydrophobic fumed silica possessed an M-value of 57 and an n-value in toluene of 3.4. Basic properties of the above hydrophobic fumed silica were as shown in Table 1.

The bulk return ratio (R: %) of the hydrophobic fumed silica was 37%.

Table 2 shows the measured results of properties of the hydrophobic fumed silica applied to the silicone oil.

Comparative Example 3

The fumed silica was compacted and was put to the hydrophobic property-imparting treatment in the same manner as in Example 1 with the exception of supplying, as hydrophobic property-imparting agent, a polydimethylsiloxane in the form of a liquid having a viscosity of 50 centistokes for 20 minutes at a rate of 100 g/min. The fumed silica put to the hydrophobic property-imparting treatment as described above possessed a specific surface area of 100 $m^2/g$, a tapping bulk density of 111 g/L, an M-value of 63 and an n-value in toluene of 2.9. Basic properties of the above hydrophobic fumed silica were as shown in Table 1.

The hydrophobic fumed silica obtained above was dispersed in a silicone oil; i.e., the hydrophobic fumed silica could be favorably kneaded but exhibited white cloudy appearance. Table 2 shows the measured results of properties of the hydrophobic fumed silica applied to the silicone oil.

Comparative Example 4

The fumed silica having a bulk density of 25 g/L used in Example 1 was treated by using a ball mill having a volume of 7 L (alumina balls 10 mm in diameter, ball filling ratio of 30%) to increase the bulk density after the treatment up to 91 g/L. 100 g of the fumed silica was stirred and mixed in a mixer having a volume of 2 L and was substituted in a nitrogen atmosphere. The hydrophobic property-imparting treatment was conducted for about one hour at a reaction temperature of 290° C. by supplying an octamethylcyclotetrasiloxane at a rate of 10 g/min for 3 minutes. After the reaction, nitrogen was supplied for 25 minutes at a rate of 0.8 L/min to remove the unreacted products and byproducts of the reaction.

The obtained hydrophobic fumed silica possessed a specific surface area of 160 $m^2/g$, a tapping bulk density of 97 g/L, an M-value of 53, and an n-value in toluene of 2.5. Basic properties of the above hydrophobic fumed silica were as shown in Table 1.

The bulk return ratio (R: %) of the hydrophobic fumed silica was 5%.

The hydrophobic fumed silica obtained above was dispersed in a silicone oil; i.e., the hydrophobic fumed silica could be favorably kneaded but was not easily dispersed and exhibited not only white cloudy appearance but also exhibited a yellow color. Table 2 shows the measured results of properties of the hydrophobic fumed silica applied to the silicone oil.

Comparative Example 5

The hydrophobic fumed silica having a tapping bulk density of 31 g/L prepared in Comparative Example 1 was treated by using the ball mill described in Comparative Example 4 to increase the bulk density. The obtained hydrophobic silica possessed a specific surface area of 153 $m^2/g$, a tapping bulk density of 124 g/L, an M-value of 55, and an n-value in toluene of 2.7.

The bulk return ratio (R: %) of the hydrophobic fumed silica was 6%.

The hydrophobic fumed silica obtained above was dispersed in a silicone oil; i.e., the hydrophobic fumed silica could be favorably kneaded but exhibited white cloudy appearance and yellow color. Table 2 shows the measured results of the hydrophobic fumed silica applied to the silicone oil.

TABLE 1

| | Hydrophobic fumed silica preparation conditions | | | Basic properties of hydrophobic fumed silica | | | | | |
|---|---|---|---|---|---|---|---|---|---|
| | Compressor | Bulk density before treated g/L | Hydrophobic agent | Bulk density after treated g/L | n-value toluene | M-value | Content of aggregated particles vol % ppm | $N_2$ content ppm | Content of metal ppm |
| Ex. 1 | vacuum compressor | 92 | D4 | 101 | 3.4 | 56 | 0 | <2 | <2 |
| Ex. 2 | " | 92 | D4 | 99 | 3.3 | 51 | 0 | <2 | <2 |
| Ex. 3 | " | 114 | D4 | 126 | 3.3 | 55 | 4 | <2 | <2 |
| Ex. 4 | " | 114 | D4 mixture | 124 | 3.3 | 55 | 4 | <2 | <2 |
| Ex. 5 | " | 76 | D5 | 87 | 3.4 | 56 | 0 | <2 | <2 |
| Comp. Ex. 1 | none | 25 | D4 | 31 | 3.4 | 58 | 0 | <2 | <2 |
| Comp. Ex. 2 | vacuum compressor | — | D4 | *59 | 3.4 | 57 | 40 | <2 | <2 |
| Comp. Ex. 3 | " | 92 | silicon oil | 111 | 2.9 | 63 | 20 | <2 | <2 |

TABLE 1-continued

| | Hydrophobic fumed silica preparation conditions | | | | Basic properties of hydrophobic fumed silica | | | | | |
|---|---|---|---|---|---|---|---|---|---|---|
| | Compressor | Bulk density before treated g/L | Hydrophobic agent | Bulk density after treated g/L | n-value toluene | M-value vol % | Content of aggregated particles ppm | $N_2$ content ppm | Content of metal ppm |
| Comp. Ex. 4 | ball mill | 91 | D4 | 97 | 2.7 | 53 | 2300 | <2 | 33 |
| Comp. Ex. 5 | " | — | D4 | *124 | 2.5 | 55 | 800 | <2 | 47 |

D4: octamethylcyclotetrasiloxane
D5: decamethylcyclopentasiloxane
D4 mixture: cyclic dimethylsiloxane mixture comprising 5 parts by wt. of hexamethylcyclotrisiloxane, 75 parts by wt. of octamethylcyclotetrasiloxane, and 20 parts by wt. of decamethylcyclopentasiloxane.
*after the hydrophobic material (31 g/L) is treated for enhancing the bulk density.
In Table 1, the bulk density stands for a tapping bulk density.

TABLE 2

Measurement of properties applied to silicone

| | Transparency | | n-Value in silicone oil | | Kneading sec | Color |
|---|---|---|---|---|---|---|
| | 1 min. dispersion | 3 min. dispersion | 1 min. dispersion | 3 min. dispersion | | |
| Ex. 1 | 0.12 | 0.11 | 2.4 | 2.5 | 57 | ○ |
| Ex. 2 | 0.13 | 0.12 | 2.4 | 2.5 | 59 | ○ |
| Ex. 3 | 0.14 | 0.13 | 2.3 | 2.4 | 47 | ○ |
| Ex. 4 | 0.14 | 0.13 | 2.3 | 2.4 | 49 | ○ |
| Ex. 5 | 0.10 | 0.09 | 2.5 | 2.6 | 78 | ○ |
| Comp. Ex. 1 | 0.12 | 0.11 | 2.4 | 2.5 | 280 | ○ |
| Comp. Ex. 2 | 0.12 | 0.11 | 2.3 | 2.5 | 173 | ○ |
| Comp. Ex. 3 | 0.21 | 0.17 | 1.9 | 2.1 | 52 | ○ |
| Comp. Ex. 4 | 0.30 | 0.22 | 1.5 | 1.9 | 61 | Δ |
| Comp. Ex. 5 | 0.39 | 0.26 | 1.3 | 1.7 | 51 | X |

The invention claimed is:

1. A hydrophobic fumed silica treated with a cyclic dimethylsiloxane, the hydrophobic fumed silica having an M-value representing an oleophilic degree in a range of 48 to 65, a tapping bulk density of larger than 80 g/L but not larger than 130 g/L, and an n-value representing the dispersion of 3.0 to 3.5 as measured in toluene; and wherein a content of aggregated particles of not smaller than 45 μm is not larger than 200 ppm in weight ratio.

2. A hydrophobic fumed silica according to claim 1, wherein a nitrogen content is not larger than 15 ppm, and a total amount of metals and metal oxide impurities is not larger than 10 ppm calculated as metals.

* * * * *